United States Patent
Sakamoto

(10) Patent No.: US 6,272,194 B1
(45) Date of Patent: Aug. 7, 2001

(54) SYNCHRONOUS SIGNAL DETECTING CIRCUIT, METHOD, AND INFORMATION STORAGE MEDIUM

(75) Inventor: Hideki Sakamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/090,146

(22) Filed: Jun. 4, 1998

(30) Foreign Application Priority Data

Jun. 4, 1997 (JP) .................................................. 9-146736

(51) Int. Cl.[7] ...................................................... H04L 7/00
(52) U.S. Cl. .......................... 375/368; 375/369; 370/514; 370/522
(58) Field of Search .................................... 375/368, 369, 375/354, 365, 366; 370/509, 511, 514, 522, 523, 510, 506; 714/735, 789

(56) References Cited

U.S. PATENT DOCUMENTS

| | | | |
|---|---|---|---|
| 4,580,129 | * 4/1986 | Bahgat | 340/347 |
| 5,315,622 | * 5/1994 | Abbiate et al. | 375/106 |
| 5,450,503 | * 9/1995 | Ogino et al. | 382/103 |
| 5,963,605 | * 10/1999 | Yasui | 375/368 |

FOREIGN PATENT DOCUMENTS

| | | |
|---|---|---|
| 4-342327 | 11/1992 | (JP) . |
| 8-32571 | 2/1996 | (JP) . |
| 8-102732 | 4/1996 | (JP) . |
| 8-125649 | 5/1996 | (JP) . |
| 8-149118 | 6/1996 | (JP) . |

OTHER PUBLICATIONS

Masahiro Iwadare et al., "A Single–Chip MPEG/Audio Decoder LSI Based on a Compact Decoding Algorithm", *Journal of VLSI Signal Processing* 16, 1997, pp. 25–30.
International Standard ISO/IEC 11172–3:1993, pp. 21–31.

* cited by examiner

*Primary Examiner*—Stephen Chin
*Assistant Examiner*—Mohammad Ghayour
(74) *Attorney, Agent, or Firm*—Sughrue, Mion, Zinn, Macpeak & Seas, PLLC

(57) ABSTRACT

When a sync pattern in a frame of a bit stream is detected to synchronize a data processing apparatus with the bit stream, data patterns containing a pattern identical to the sync pattern are often erroneously detected as the sync pattern. In order to overcome such problem, an apparatus for detecting data in a bit stream is provided. The bit stream contains a sequence of frames, and each frame has a predetermined number of bits and comprises a sync pattern and a data portion. The apparatus contains a detecting circuit, a counting circuit, and a synchronization signal generating circuit. The detecting circuit detects a first data pattern in the bit stream that equals the sync pattern and detects a second data pattern in the bit stream that equals the sync pattern. The counting circuit begins counting bits in the bit stream to generate a count value when the first data pattern is detected by the detection circuit. The synchronization signal generating circuit receives the count value from the counting circuit and compares the count value with a predetermined value when the second data pattern is detected by the detecting circuit. Then, the generating circuit outputs a synchronization signal when the count value and the predetermined value have a predetermined relationship.

42 Claims, 6 Drawing Sheets

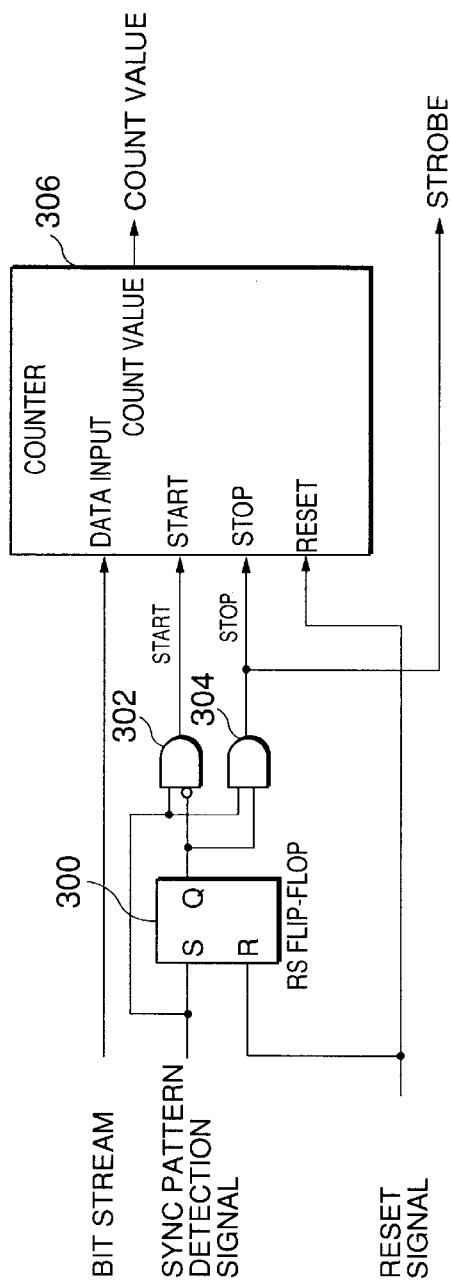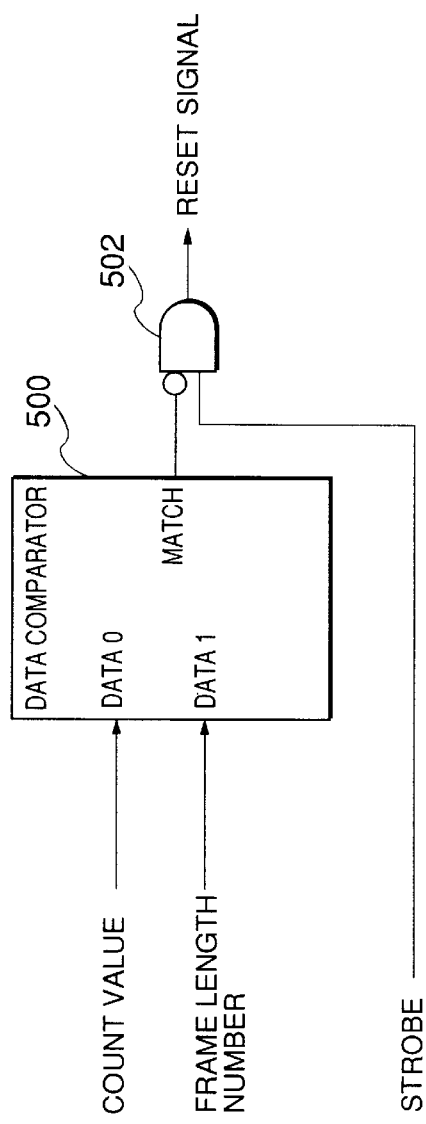
Fig.5
Fig.6

SYNCHRONOUS SIGNAL DETECTING CIRCUIT, METHOD, AND INFORMATION STORAGE MEDIUM

FIELD OF THE INVENTION

The present invention relates to a synchronization signal detecting circuit and a method employed by the circuit. More particularly, the invention relates to a circuit and method for detecting a sync pattern in a bit stream such as a Moving Picture Coding Experts Group ("MPEG") audio bit stream. Also, the present invention relates to a program which causes a processor to execute the method for detecting the sync pattern and relates to an information storage medium for storing the program.

BACKGROUND OF THE INVENTION

In many communication and entertainment systems, the systems receive and process data contained in a bit stream. In order to synchronize the operations of the systems with the data in the bit stream, the systems must detect a sync pattern contained in the bit stream to determine the beginning of a particular segment (i.e. frame) contained in the bit stream.

FIG. 3 illustrates an example of a bit stream of a digital signal such as MPEG audio bit stream. As shown in the figure, the bit stream is divided into a plurality of sequential frames, and each of the frames contains a header portion, an audio data portion, and an ancillary data portion. Also, each of the frames in the MPEG audio bit stream has the same length.

The header portion comprises a sync pattern followed by coded data. If the MPEG audio bit stream follows the standard set by the International Standardization Organization/ International Electrotechnical Commission ("ISO/IEC") 11172-3, the sync pattern is defined by a series of 12 bits having a logic value equal to "1" (i.e. "111111111111"). Also, the coded data following the sync pattern comprises 20 bits of data which indicate characteristics of the bit stream or frame. For example, the coded data may indicate the length of the frames in the bit stream or the particular format of the data in the bit stream.

The audio data portion contains audio data (e.g. data needed to reproducing a song) transmitted in the bit stream. Also, the ancillary data portion contains ancillary data that may be generated at the transmission source of the bit stream. The ancillary data may indicate the titles of the songs contained in the audio data portion and/or the names of the singers which sing the songs.

An apparatus which processes the data contained in an MPEG audio bit stream to reproduce an audio signal corresponding to the audio data contains a synchronization detecting circuit for detecting the sync pattern. After the timing of the sync pattern is determined, the apparatus can accurately locate and process the coded data and audio data to reproduce the audio signal.

However, since many types of ancillary data may potentially be contained in the ancillary data portion of the bit stream, a significant possibility exists that a series of 12 bits having a logic value equal to "1" (i.e. "111111111111") is contained in the ancillary data portion. In order to avoid erroneously identifying a particular data pattern "111111111111" in the ancillary data portion as the sync pattern, the synchronization detection circuit determines if another data pattern "111111111111" is separated from the particular data pattern "111111111111" by the period of one frame of the bit stream. In other words, since the beginning of the sync pattern is located at the first bit in each frame and since each frame in the MPEG audio bit stream is the same length, the detection circuit assumes that two data patterns "111111111111" separated by the period of a frame are sync patterns.

However, since various types of data are stored in the ancillary data portion of a frame, a significant possibility exists that data patterns "111111111111" will be respectively contained in the same positions in the ancillary data portions of sequential frames. For example, as mentioned above, the title of a song may be stored in the ancillary data portion, and it may be repeated in a plurality of frames to enable the title to be easily read by a reproducing apparatus. Therefore, if the data representing the title of the song contains the data pattern "111111111111", such data pattern "111111111111" will likely be repeated at the same locations in the ancillary data portions of sequential frames. Thus, they will be separated by a period of one frame, and the conventional synchronization detection circuit will erroneously detect the data relating to the title of the song as a sync pattern.

FIG. 4 illustrates a bit stream in which a data pattern "111111111111" is repeatedly contained in the ancillary data portion of sequential frames. In particular, the bit stream contains a three sequential frames 70, 80, and 90, which respectively have sync patterns 100, 102, and 104. Also, the ancillary data portions of the frames 70, 80, and 90, contain the data patterns "111111111111" 200, 202, and 204. Also, the data patterns "111111111111" 200, 202, and 204 are located at the same bit position in each of the ancillary data portions, and thus, they are separated by a period of one frame. Thus, the data patterns "111111111111" will likely be erroneously detected as a sync pattern.

As described above, a substantial possibility exists that data patterns "111111111111" may be separated by a period of one frame but may not be sync patterns. In such case, a synchronization detection circuit may erroneously recognize such data patterns "111111111111" as sync patterns. When the synchronization of the apparatus is established based on the erroneous data patterns "111111111111", the apparatus is not capable of properly reproducing the audio data contained in the audio data portion of the frame, and noise is produced.

SUMMARY OF THE INVENTION

An object of the present invention is to provide a data processing apparatus and method which are capable of correctly detecting a sync pattern in a bit stream even if a data pattern that is identical to the sync pattern is recorded in an ancillary data portion in a frame of a bit stream.

In order to achieve the above and other objects, an apparatus for detecting data in a bit stream is provided. The bit stream contains a sequence of frames, and each frame has a predetermined number of bits and comprises a sync pattern and a data portion. The apparatus comprises: a detecting circuit which detects a first data pattern in said bit stream that equals said sync pattern and detects a second data pattern in said bit stream that equals said sync pattern; a counting circuit operably coupled to said detecting circuit, wherein said counting circuit begins counting bits in said bit stream to generate a count value when said first data pattern is detected by said detection circuit; and a synchronization signal generating circuit operably connected to said counting circuit, wherein said synchronization signal generating circuit receives said count value from said counting circuit and compares said count value with a predetermined value when said second data pattern is detected by said detecting circuit, wherein said synchronization signal generating circuit outputs a synchronization signal when said count value and said predetermined value have a predetermined relationship.

In order to further achieve the above and other objects, a method for detecting data in a bit stream is provided. The bit stream contains a sequence of frames, and each frame has a predetermined number of bits and comprises a sync pattern and a data portion. The method comprises the steps of: (a) inputting said bit stream; (b) detecting a first data pattern in said bit stream that equals said sync pattern; (c) detecting a second data pattern in said bit stream that equals said sync pattern; (d) generating a count value by beginning to count bits in said bit stream when said first data pattern is detected; and (e) comparing said count value with a predetermined value when said second data pattern is detected and outputting a synchronization signal when said count value and said predetermined value have a predetermined relationship.

In order to additionally achieve the above and other objects, an information storage medium in which a software program has been stored is provided. The software program instructs a processor to perform the steps of: (a) inputting a bit stream, wherein said bit stream contains a sequence of frames and wherein each frame has a predetermined number of bits and comprises a sync pattern and a data portion; (b) detecting a first data pattern in said bit stream that equals said sync pattern; (c) detecting a second data pattern in said bit stream that equals said sync pattern; (d) generating a count value by beginning to count bits in said bit stream when said first data pattern is detected; and (e) comparing said count value with a predetermined value when said second data pattern is detected and outputting a synchronization signal when said count value and said predetermined value have a predetermined relationship.

BRIEF DESCRIPTION OF THE DRAWINGS

The above objects and advantages of the present invention will become more apparent by describing in detail preferred embodiments thereof with reference to the attached drawings in which:

FIG. 5 is a diagram of an illustrative embodiment of the counting circuit shown in FIG. 1;

FIG. 6 is a diagram of an illustrative embodiment of the comparing circuit shown in FIG. 1;

DETAILED DESCRIPTION OF THE PREFERRED EMBODIMENTS

The following description of the preferred embodiments discloses specific configurations and values. However, the preferred embodiments are merely examples of the present invention, and thus, the specific features described below are merely used to more easily describe such embodiments and to provide an overall understanding of the present invention. Accordingly, one skilled in the art will readily recognize that the present invention is not limited to the specific embodiments described below. Furthermore, the descriptions of various configurations and values of the present invention which would have been known to one skilled in the art are omitted for the sake of clarity and brevity.

Figure 1:
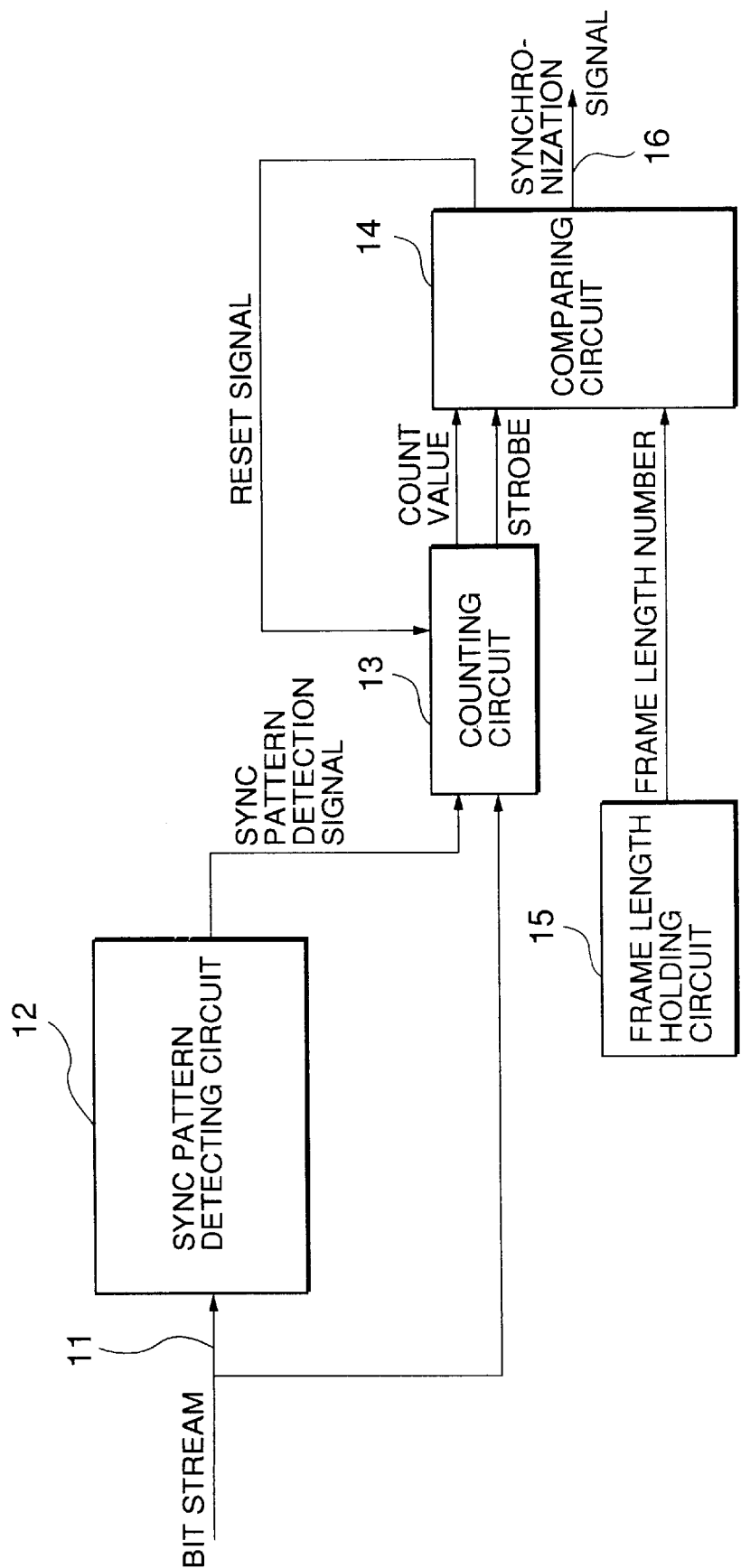
FIG. 1 is a circuit diagram of a synchronization detecting circuit according to an illustrative embodiment of the present invention.

FIG. 1 is a circuit diagram of a synchronization detecting circuit of a data processing apparatus according to an embodiment of the present invention. As shown in the figure, the detecting circuit comprises a sync pattern detecting circuit 12, a counting circuit 13, a comparing circuit 14, and a frame length holding circuit 15.

The detecting circuit 12 inputs a bit stream of data via a data input terminal 11 and detects a predetermined data pattern in the bit stream. The bit stream contains a plurality of frames which each have the same length and which each contain a sync pattern corresponding to the predetermined data pattern. In order to detect the sync pattern, the detecting circuit 12 may be initially set with the predetermined data pattern. Then, as the incoming data in the bit stream is input, the circuit 12 compares the incoming data with the predetermined data pattern. When the incoming data matches the predetermined data pattern, the circuit 12 determines that the predetermined data pattern has been detected in the bit stream. If the bit stream is an MPEG audio bit stream, the sync pattern detecting circuit 12 would determine that a sync pattern is contained in the bit stream when the incoming data equals "111111111111". When the detecting circuit 12 detects the predetermined data pattern in the bit stream, it outputs a sync pattern detection signal.

The counting circuit 13 inputs the bit stream of data via the input terminal 11 and inputs the sync pattern detection signal from the detecting circuit 12. Upon receiving a first sync pattern detection signal from the detecting circuit 12, the counting circuit 13 begins counting the bits of data in the bit stream and outputs a corresponding count value. When a subsequent sync pattern detection signal is received from the detecting circuit 12, the counting circuit 13 stops counting the bits contained in the bit stream and outputs a strobe signal indicating that the second sync pattern detection signal has been detected. Afterwards, any additional sync pattern detection signals input by the counting circuit 13 alternatively cause the circuit 13 to begin counting the bits in the bit stream and to stop counting the bits in the bit stream.

An illustrative example of the counting circuit 13 is shown in FIG. 5. In the example, the counting circuit 13 comprises an RS flip-flop 300, first and second AND gates 302 and 304, and a counter 306. The flip-flop 300 inputs a sync pattern detection signal from the detecting circuit 12 via its set input and inputs a reset signal (described below) via its reset input. The first AND gate 302 inputs the sync pattern detection signal and an inverted output from the flip-flop 300, performs an AND operation on such signals, and outputs a start signal 402. The second AND gate 304 inputs the sync pattern detection signal and a non-inverted output from the flip-flop 300, performs an AND operation on such signals, and outputs a stop signal 406. The counter 306 inputs the bit stream from the input terminal 11, the start signal 402, and the stop signal 406, begins counting the number of bits of data in the bit stream after the start signal 402 is received, and outputs a corresponding count value. The counter 306 also stops counting the number of bits in the bit stream when the stop signal 406 is received. In addition, the reset signal is input to the counter 306 and resets the count value of the counter 306 to an initial value. Also, the counting circuit 14 outputs the stop signal 406 as the strobe signal 408.

The frame length holding circuit 15 comprises a memory (e.g. a read only memory ("ROM"), random access memory ("RAM"), etc) and stores a frame length number which corresponds to the number of bits contained in one frame of the bit stream. For example, if the bit stream is an MPEG audio bit stream, the bit rate is 192 kbps, and the sampling frequency is 48 kHz, the circuit 15 would store the number "4608" because such number corresponds to the number of bits in a frame of the MPEG audio bit stream.

The comparing circuit 14 inputs the count value from the counting circuit 13 and inputs the frame length number stored in the frame length holding circuit 15. Then, the circuit 14 determines if the count value equals the frame length number. If the two numbers are equal, the comparing circuit 14 outputs a synchronization signal via an output terminal 16 to indicate that a sync pattern has been detected. On the other hand, if the count value does not equal the frame length number, the comparing circuit 14 outputs a reset signal via an output terminal 17. The reset signal is output to the counting circuit 13 and resets the count value of the counting circuit 13.

FIG. 6 is a diagram of an example of an illustrative embodiment of the comparing circuit 14 shown in FIG. 1. The comparing circuit 14 comprises a data comparator 500 and an AND gate 502. The comparator 500 inputs the count value from the counter 306 and the frame length number from the holding circuit 15, compares the two numbers, and outputs a match signal which equals a logic "1" when the two numbers are equal. The AND gate 502 inputs the match signal from the comparator 500 and the strobe signal from the AND gate 304 and outputs a corresponding reset signal.

Figure 7:
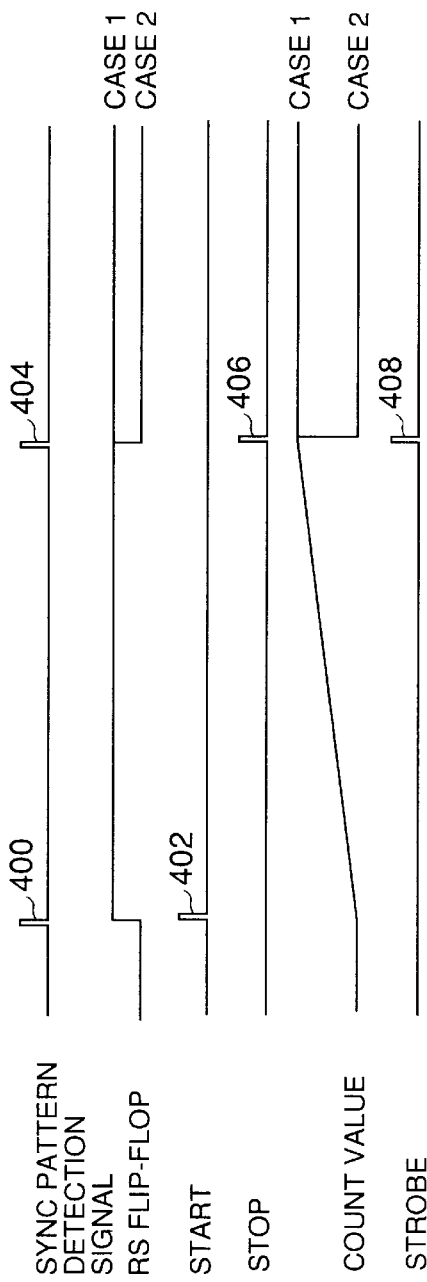
FIG. 7 is a timing diagram of the various signals input to and generated by the counting circuit and comparing circuit shown in FIGS. 5 and 6.

FIG. 7 is a timing diagram which illustrates the operation of the counting circuit 13 and the comparing circuit 14. Before a first sync pattern detection signal 400 is output from the detection circuit 12, the flip-flop 300 outputs a logic "0" as its non-inverted output, and thus, the inverted output equals a logic "1". Therefore, immediately when the signal 400 is output, the AND gate 302 inputs the detection signal 400 (i.e. a logic "1") and the inverted output (i.e. a logic "1") and outputs the start signal 402. As a result, the counter 306 begins counting the number of data bits in the bit stream and outputs the corresponding count value. The detection signal 400 is also input via the set input of the flip-flop 300 and causes the flip-flop to output a logic "1" as its non-inverted output. As a result, the inverted output equals a logic "0", and the AND gate 302 outputs a logic "0" as the start signal 402.

Subsequently, immediately after a second sync pattern detection signal 404 is output, the AND gate 304 inputs the signal 404 (i.e. a logic "1") and the non-inverted output of the flip-flop 300 (i.e. a logic "1") and outputs the stop signal 406. As a result, the counter 306 stops counting the number of data bits in the bit stream and outputs the corresponding count value.

Also, the strobe signal 408 is output when the stop signal 406 is generated. As a result, the AND gate 502 of the comparing circuit 14 outputs the match signal as the reset signal when the strobe signal is output. In other words, the match signal is output as the reset signal when the second sync pattern detection signal 404 is detected. Thus, when the count value does not equal the frame length number, the match signal equals a logic "0", the AND gate 502 outputs a logic "1" as the reset signal. On the other hand, when the count value equals the frame length number, the match signal equals a logic "1", and the AND gate 502 outputs a logic "0" as the reset signal. The match signal is also output from the comparing circuit 14 as the synchronization signal.

As shown in FIGS. 5 and 7, if the reset signal equals a logic "0" when the second detection signal 404 is output, the flip-flop 300 is not reset and the count value of the counter 300 is not reset to an initial value (case 1). On the other hand, if the reset signal equals a logic "1" when the second detection signal 404 is output, the flip-flop 300 is reset and the count value of the counter 300 is reset to an initial value (case 2).

Figure 8:
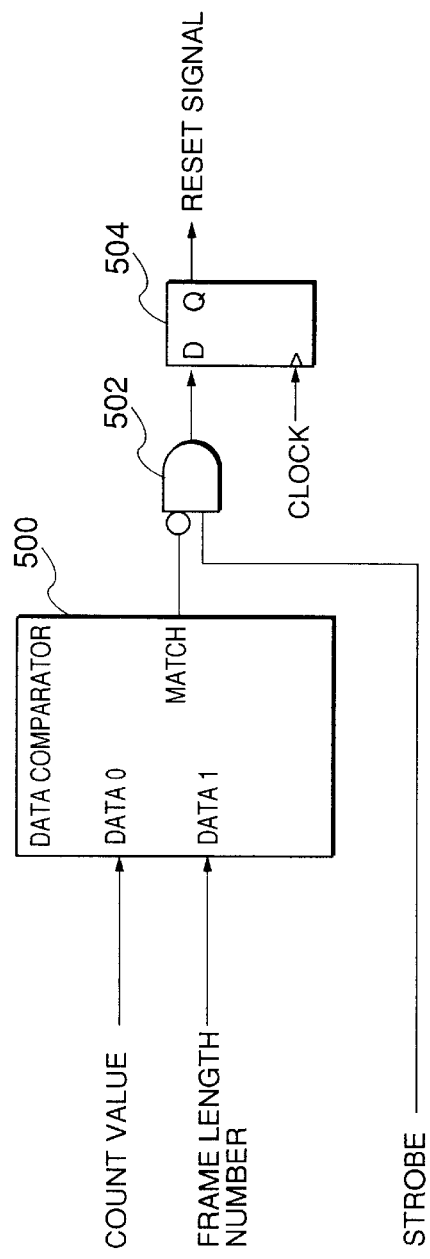
FIG. 8 shows another illustrative embodiment of the comparing circuit shown in FIG. 1.

Another embodiment of the comparing circuit 14 is shown in FIG. 8. The comparing circuit 14 shown in FIG. 8 is similar to the circuit 14 shown in FIG. 6 except that the circuit further comprises a flip-flop 504. The flip-flop 504 inputs the output of the AND gate 502 and outputs such signal as the reset signal in synchronicity with a clock signal.

Figure 2:
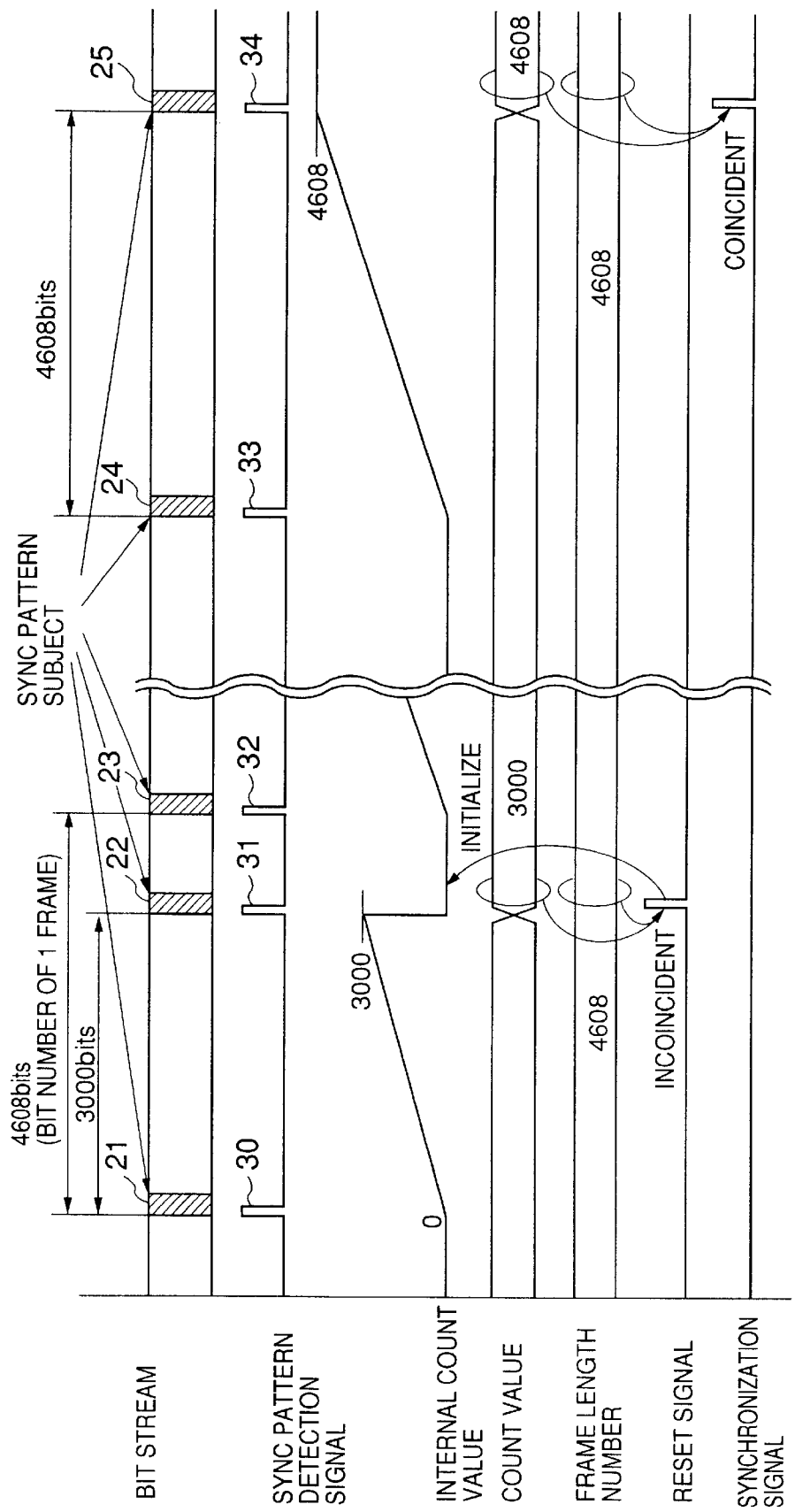
FIG. 2 is a timing diagram of the various signals generated by the synchronization detecting circuit shown in FIG. 1.
Figure 3:
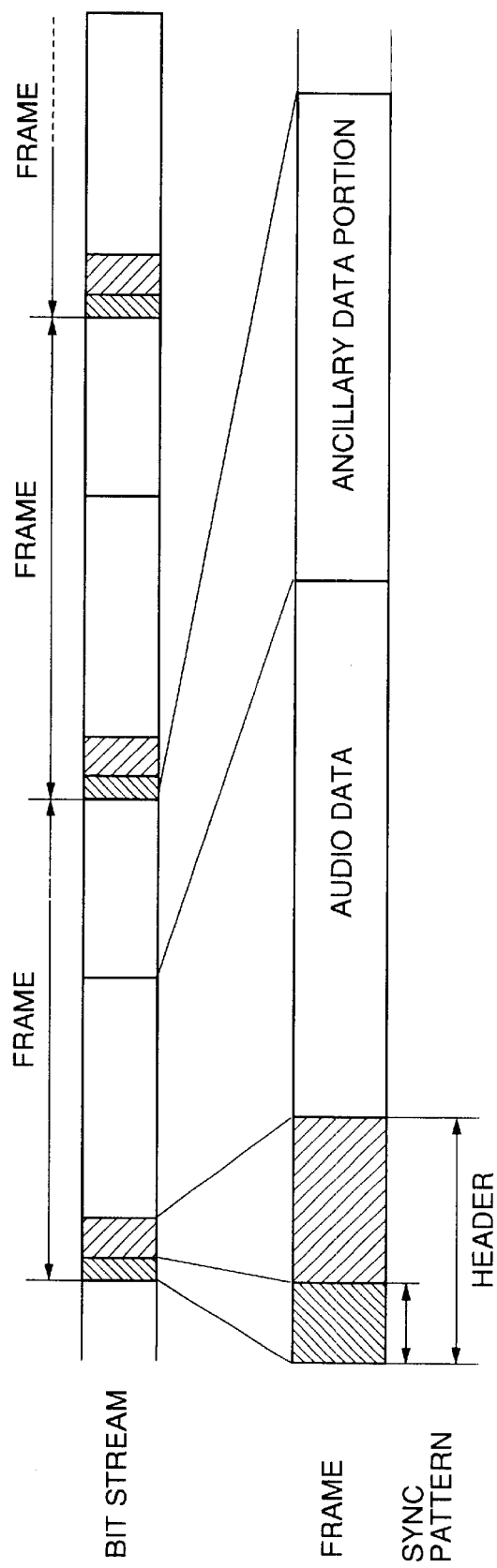
FIG. 3 is a diagram of an MPEG audio bit stream.
Figure 4:
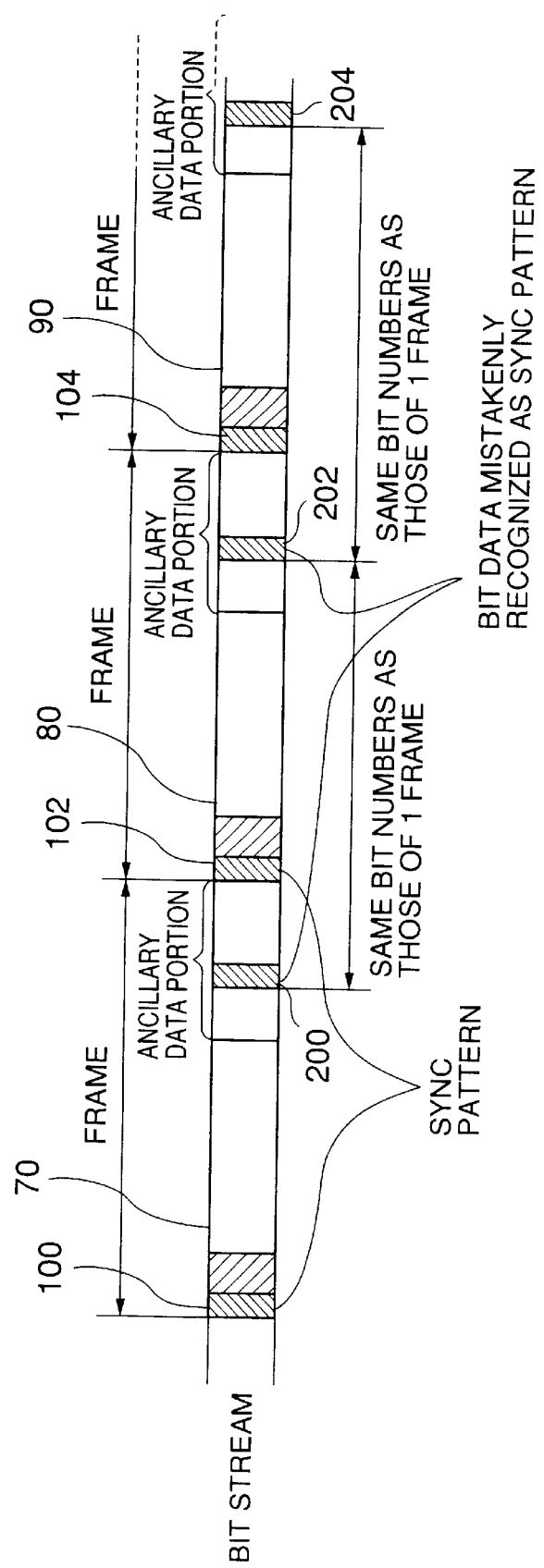
FIG. 4 is a diagram which indicates that data patterns which are equivalent to a sync pattern can be sequentially contained in an ancillary data portion of sequential frames of the MPEG audio bit stream.

A detailed example of the data processing operation performed by the synchronization detection circuit of the present embodiment will be described in conjunction with FIG. 2 which is a timing diagram of the various signals processed or generated by the synchronization detecting circuit. If the bit stream input via the input terminal 11 is an MPEG audio bit stream, the length of each frame in the bit stream equals 4608 bits, and the sync pattern in each frame equals the data pattern "111111111111".

When the sync pattern detecting circuit 12 detects the first sync pattern 21 in the bit stream, it outputs a first sync pattern detection signal 30. As a result, the counting circuit 13 begins counting the bits in the bit stream and incrementing its count value. After the 3000th bit in the bit stream has been counted, a data pattern 22 in the ancillary data portion of the first frame of the bit stream equals "111111111111". As a result, the sync pattern detecting circuit 12 outputs a second sync pattern detection signal 31, and the counting circuit 13 stops counting the bits in the bit stream, outputs the count value "3000" to the comparing circuit 14, and outputs the strobe signal to the comparing circuit. Upon comparing the count value "3000" with the frame length number "4608", the comparing circuit 14 determines that such numbers are not equal and outputs the reset signal 40. As a result, the count value in the counting circuit 13 is reset to an initial value.

The count value remains at the initial value until the sync pattern 23 of the second frame is detected by the detecting circuit 12. At such time, the circuit 12 outputs a third sync pattern detection signal 32, and the counting circuit 13 begins incrementing the internal count value by counting the bits in the bit stream. This process continues until the detecting circuit 12 sequentially detects two actual sync patterns in the bit stream.

For example, when the detecting circuit 12 detects the sync pattern 24 in the bit stream, a sync pattern detection signal 33 is output to the counting circuit 13, and the circuit 13 begins counting the bits in the bit stream. Then, when the next sync pattern 25 is detected by the detecting circuit 12, a sync pattern detection signal 34 is output to the counting circuit 13. As a result, the circuit 13 stops counting the bits in the bit stream and outputs the count value "4608" and the strobe signal. Since the count value "4608" equals the frame length number "4608" stored in the frame length holding circuit 15, the comparing circuit 14 outputs the synchronization signal 50.

Since the synchronization detecting circuit of the present embodiment only generates the synchronization signal when two actual sync patterns are sequentially detected, the circuit cannot erroneously detect ancillary data as a sync pattern. As a result, the synchronization detecting circuit enables a reproducing apparatus to consistently reproduce audio data from a bit stream without generating noise.

Clearly, the present invention is not limited to the specific embodiments described above. For example, the invention is not limited to detecting sync patterns in an MPEG audio bit stream. In fact, the present invention can detect any predetermined data pattern in a bit stream which has frames that are a constant length and in which the data pattern is transmitted in the same location of each of the data frames.

Also, in the embodiment described above, the detecting apparatus is constructed via hardware. However, the apparatus may be implemented via software or a combination of hardware and software.

For example, MPEG data is typically reproduced by using hardware circuitry known as an "MPEG board". On the other hand, the MPEG data may be reproduced via a computer or processor by using an application program (i.e. a "soft PEG"). In such case, the application program instructs the processor to simulate the data detection operation described above in conjunction with the synchronization detecting circuit and may be stored as in an information storage medium such as a ROM, a RAM, a hard disk drive ("HDD"), a CD-ROM, or a floppy disk ("FD"). Thus, the program may be stored in the information storage medium which supplies the synchronization detecting software to the processor. The program may instruct the processor to input a bit stream and detect a particular data pattern in the bit stream. Then, the program may instruct the processor to begin generating a count value by counting the number of bits in the bit stream when the data pattern is first detected in the bit stream and to stop counting the bits in the bit stream when the data pattern is subsequently detected in the bit stream. After the processor stops counting the bits, the program may instruct the processor to compare the count value with a predetermined value. If the count value equals the predetermined value, the program may instruct the processor to output a synchronization signal. On the other hand, if the values are not equal, the program may instruct the processor to reset the count value to an initial value. After the count value is reset, the program may instruct the processor to begin counting the number of bits in the bit stream when a subsequent data pattern is detected.

As described above, the present invention is capable of accurately synchronizing a data processing apparatus with data in a bit stream by detecting two sequential sync patterns in a bit stream. Three situations may occur in which ancillary data could potentially be mistakenly detected as a sync pattern. First, an actual sync pattern may be initially detected in the bit stream, and then, ancillary data in an ancillary data portion of a frame may be mistakenly detected as a sync pattern. Second, the ancillary data may be initially and erroneously detected as a sync pattern, and then, an actual sync pattern may be detected. Third, a first set of ancillary data contained in the ancillary data portion may be initially and erroneously detected as a sync pattern, and then, a second set of ancillary data contained in the same ancillary data portion may be detected as a sync pattern.

In all of the cases above, the count value output to the comparing circuit 14 (or processed via software) will not equal the number of bits in a frame of the bit stream. As a result, the count value is reset, the ancillary data is not detected as a sync pattern, and a synchronization signal is not generated. Also, by resetting the count value to an initial value when two actual sync patterns are not sequentially detected, the actual sync patterns within the bit stream can be more quickly detected to synchronize the data processing apparatus with the data in the bit stream.

The previous description of the preferred embodiments is provided to enable a person skilled in the art to make or use the present invention. Moreover, various modifications to these embodiments will be readily apparent to those skilled in the art, and the generic principles defined herein may be applied to other embodiments without the use of inventive faculty. Therefore, the present invention is not intended to be limited to the embodiments described herein but is to be accorded the widest scope as defined by the claims.

What is claimed is:

1. An apparatus for detecting data in a bit stream, wherein said bit stream contains a sequence of frames, wherein each frame has a predetermined number of bits and comprises a sync pattern and a data portion, and wherein said apparatus comprises:

a detecting circuit which detects a first data pattern in said bit stream that equals said sync pattern and detects a second data pattern in said bit stream that equals said sync pattern;

a counting circuit operably coupled to said detecting circuit, wherein said counting circuit begins counting bits in said bit stream to generate a count value when said first data pattern is detected by said detection circuit; and a synchronization signal generating circuit operably connected to said counting circuit, wherein said synchronization signal generating circuit receives said count value from said counting circuit and compares said count value with a predetermined value when said second data pattern is detected by said detecting circuit, wherein said synchronization signal generating circuit outputs a synchronization signal when said count value and said predetermined value have a predetermined relationship.

2. The apparatus as claimed in claim 1, wherein said synchronization signal generating circuit comprises:

a comparing circuit which compares said count value with said predetermined value and outputs said synchronization signal when said count value equals said predetermined value.

3. The apparatus as claimed in claim 2, wherein said comparing circuit outputs a reset signal when said count value does not equal said predetermined value when said second data pattern is detected, and wherein said reset signal is output to said counting circuit and resets said count value to an initial value.

4. The apparatus as claimed in claim 1, wherein said counting circuit stops counting said bits in said bit stream when said detecting circuit detects said second data pattern in said bit stream.

5. The apparatus as claimed in claim 4, wherein said count value is reset when said detecting circuit detects said second data pattern in said bit stream and when said count value and said predetermined value do not have said predetermined relationship, and wherein said counting circuit subsequently begins counting said bits in said bit stream when said detecting circuit detects a third data pattern in said bit stream that equals said sync pattern.

6. The apparatus as claimed in claim 2, wherein said synchronization signal generating circuit comprises a storage device which is operatively coupled to said comparing circuit and which stores said predetermined value, and wherein said storage device outputs said predetermined value to said comparing circuit.

7. The apparatus as claimed in claim 1, wherein said predetermined value equals said predetermined number of bits in one of said frames of said bit stream.

8. An apparatus for detecting data in a bit stream, wherein said bit stream contains a sequence of frames, wherein each of said frames comprises a sync pattern and a data portion and has a predetermined number of bits, and wherein said apparatus comprises:

a detecting circuit which inputs said bit stream, detects a first data pattern in said bit stream that equals said sync pattern, outputs a first detection signal when said first data pattern is detected, detects a second data pattern in said bit stream that equals said sync pattern, and outputs a second detection signal when said second data pattern is detected;

a counting circuit which is operatively coupled to said detecting circuit and which inputs said bit stream and begins counting bits in said bit stream when said first detection signal is output to generate a count value; and a synchronization signal generating circuit which is operatively coupled to said counting circuit and which inputs said count value from said counting circuit, compares said count value with a predetermined value, and outputs a synchronization signal when said count value and said predetermined value have a predetermined relationship.

9. The apparatus as claimed in claim 8, wherein said counting circuit stops counting said bits in said bit stream in response to said second detection signal.

10. The apparatus as claimed in claim 8, wherein said synchronization signal generating circuit outputs a reset signal when said count value and said predetermined value do not have said predetermined relationship and when said second detection signal is generated, and wherein said reset signal is output to said counting circuit and resets said count value.

11. The apparatus as claimed in claim 8, wherein said detecting circuit detects a third data pattern in said bit stream that equals said sync pattern and outputs a third detection signal when said third data pattern is detected, and wherein said counting circuit inputs said third detection signal and begins counting said bits in said bit stream to generate said count value in response to said third detection signal.

12. The apparatus as claimed in claim 8, wherein said synchronization signal generating circuit comprises:

a storage device which stores said predetermined value; and a comparing circuit which is operatively coupled to said storage device, inputs said predetermined value and said count value, compares said predetermined value and said count value, and outputs said synchronization signal when said predetermined value and said count value have said predetermined relationship.

13. The apparatus as claimed in claim 8, wherein said synchronization signal generating circuit outputs synchronization signal when said count value equals said predetermined value.

14. The apparatus as claimed in claim 13, wherein said predetermined value equals said predetermined number of bits in each of said frames.

15. The apparatus as claimed in claim 10, wherein said counting circuit comprises:

a counter controller which inputs said first detection signal and outputs a start signal in response to said first detection signal and which inputs said second detection signal and outputs a stop signal in response to said second detection signal; and a counter which inputs said bit stream, said start signal, said stop signal, and said reset signal, wherein said counter begins counting said bits in said bit stream upon receiving said start signal to generate said count value and stops counting said bits upon receiving said stop signal, and wherein said counter resets said count value upon receiving said reset signal.

16. The apparatus as claimed in claim 15, wherein said counter controller comprises:

a flip-flop which inputs said first and second detection signals via a set terminal and outputs a corresponding output signal;

a first gate circuit which is connected to said flip-flop and inputs said first detection signal, wherein said first gate circuit outputs said start signal when said first detection signal has a first logic value and said output signal has a second logic value; and a second gate circuit which is connected to said flip-flop and inputs said second detection signal, wherein said second gate circuit outputs said stop signal when said second detection signal and said output signal have said first logic value.

17. The apparatus as claimed in claim 16, wherein said flip-flop inputs said reset signal via a reset terminal and resets said output signal based on said reset signal.

18. The apparatus as claimed in claim 17, wherein said synchronization signal generating circuit comprises:

a comparator which inputs said count value from said counter and outputs a match signal as said synchronization signal when said count value and said predetermined value have said predetermined relationship; and a third gate circuit which inputs said stop signal and said match signal and outputs said reset signal when said stop signal is generated and said match signal indicates that said count value and said predetermined value do not have said predetermined relationship.

19. A method for detecting data in a bit stream containing a sequence of frames, wherein each frame has a predetermined number of bits and comprises a sync pattern and a data portion and wherein said method comprises the steps of:

(a) inputting said bit stream;

(b) detecting a first data pattern in said bit stream that equals said sync pattern;

(c) detecting a second data pattern in said bit stream that equals said sync pattern;

(d) generating a count value by beginning to count bits in said bit stream when said first data pattern is detected; and (e) comparing said count value with a predetermined value when said second data pattern is detected and outputting a synchronization signal when said count value and said predetermined value have a predetermined relationship.

20. The method as claimed in claim 19, wherein said step (e) comprises the step of:

(e1) outputting said synchronization signal when said count value equals said predetermined value.

21. The method as claimed in claim 20, wherein said step (e) further comprises the step of:

(e2) resetting said count value when said count value does not equal said predetermined value and when said second data pattern is detected.

22. The method as claimed in claim 19, further comprising the step of:
(f) ceasing to count said bits in said bit stream when said second data pattern is detected.

23. The method as claimed in claim 22, further comprising the steps of:
(f) resetting said count value when said second data pattern is detected;
(g) detecting a third data pattern in said bit stream that equals said sync pattern; and
(h) regenerating said count value by beginning to count said bits in said bit stream when said third data pattern in said bit stream is detected.

24. The method as claimed in claim 19, wherein said predetermined value equals said predetermined number of bits in one of said frames of said bit stream.

25. A method for detecting data in a bit stream containing a sequence of frames, wherein each of said frames comprises a sync pattern and a data portion and has a predetermined number of bits and wherein said method comprises the steps of:
(a) inputting said bit stream;
(b) detecting a first data pattern in said bit stream that equals said sync pattern;
(c) outputting a first detection signal when said first data pattern is detected;
(d) detecting a second data pattern in said bit stream that equals said sync pattern;
(e) outputting a second detection signal when said second data pattern is detected;
(f) generating a count value by beginning to count bits in said bit stream in response to said first detection signal;
(g) comparing said count value with a predetermined value to determine if said count value and said predetermined value have a predetermined relationship; and
(h) outputting a synchronization signal when said count value and said predetermined value have said predetermined relationship.

26. The method as claimed in claim 25, further comprising the step of:
(i) ceasing to count said bits in said bit stream in response to said second detection signal.

27. The method as claimed in claim 26, wherein said step (h) comprises the step of:
(h1) generating a reset signal when said count value and said predetermined value do not have said predetermined relationship and when said second detection signal is output, and
(h2) resetting said count value in response to said reset signal.

28. The method as claimed in claim 26, further comprising the steps of:
(j) detecting a third data pattern in said bit stream that equals said sync pattern;
(k) outputting a third detection signal when said third data pattern is detected; and
(l) regenerating said count value by beginning to count said bits in said bit stream in response to said third detection signal.

29. The method as claimed in claim 25, wherein said step (h) comprises the step of:

(h1) outputting said synchronization signal when said count value equals said predetermined value.

30. The method as claimed in claim 25, wherein said predetermined value equals said predetermined number of bits contained in each of said frames.

31. The method as claimed in claim 28, wherein said count value and said predetermined value have said predetermined relationship when said count value equals said predetermined value.

32. The method as claimed in claim 31, wherein said predetermined value equals said predetermined number of bits contained in each of said frames.

33. The method as claimed in claim 27,
wherein said step (f) comprises the steps of:
(f1) inputting said first detection signal and outputting a start signal in response to said first detection signal; and
(f2) beginning to count said bits in said bit stream upon receiving said start signal to generate said count value, and
wherein said step (i) comprises the steps of:
(i1) inputting said second detection signal and outputting a stop signal in response to said second detection signal; and
(i2) ceasing to count said bits upon receiving said stop signal.

34. The method as claimed in claim 33,
wherein said step (f1) comprises the steps of:
(f1a) inputting said first detection signal to a set terminal of a flip-flop and outputting a corresponding output signal from said flip-flop; and
(f1b) inputting said first detection signal and outputting said start signal when said first detection signal has a first logic value and said output signal has a second logic value, and
wherein said step (i1) comprises the steps of:
(i1a) inputting said second detection signal to a set terminal of a flip-flop and outputting said output signal from said flip-flop; and
(i1b) inputting said second detection signal and outputting said stop signal when said second detection signal and said output signal have said first logic value.

35. The method as claimed in claim 34, wherein said step (h2) further comprises the step of:
(h2a) inputting said reset signal via a reset terminal of said flip-flop and resetting said output signal based on said reset signal.

36. The method as claimed in claim 35,
wherein said step (g) comprises the step of:
(g1) inputting said count value and outputting a match signal as said synchronization signal when said count value and said predetermined value have said predetermined relationship; and
wherein said step (h1) comprises the step of:
(1a) inputting said stop signal and said match signal and outputting said reset signal when said stop signal is generated and said match signal indicates that said count value and said predetermined value do not have said predetermined relationship.

37. An information storage medium in which a software program has been stored, wherein said software program instructs a processor to perform the steps of:
(a) inputting a bit stream, wherein said bit stream contains a sequence of frames and wherein each frame has a predetermined number of bits and comprises a sync pattern and a data portion;

(b) detecting a first data pattern in said bit stream that equals said sync pattern;

(c) detecting a second data pattern in said bit stream that equals said sync pattern;

(d) generating a count value by beginning to count bits in said bit stream when said first data pattern is detected; and (e) comparing said count value with a predetermined value when said second data pattern is detected and outputting a synchronization signal when said count value and said predetermined value have a predetermined relationship.

38. The information storage system as claimed in claim 37, wherein said step (e) comprises the step of:

(e1) outputting said synchronization signal when said count value equals said predetermined value.

39. The information storage medium as claimed in claim 38, wherein said step (e) further comprises the step of:

(e2) resetting said count value when said count value does not equal said predetermined value and when said second data pattern is detected.

40. The information storage medium as claimed in claim 37, further comprising the step of:

(f) ceasing to count said bits in said bit stream when said second data pattern is detected.

41. The information storage medium as claimed in claim 40, further comprising the steps of:

(g) resetting said count value when said second data pattern is detected;

(h) detecting a third data pattern in said bit stream that equals said sync pattern; and (i) regenerating said count value by beginning to count said bits in said bit stream when said third data pattern in said bit stream is detected.

42. The information storage medium as claimed in claim 37, wherein said predetermined value equals said predetermined number of bits in one of said frames of said bit stream.

* * * * *